United States Patent

Hasfar et al.

(10) Patent No.: US 8,917,471 B1
(45) Date of Patent: Dec. 23, 2014

(54) POWER MANAGEMENT FOR DATA STORAGE DEVICE

(71) Applicant: Western Digital Technologies, Inc., Irvine, CA (US)

(72) Inventors: Zaihas Amri Fahdzan Hasfar, Selangor (MY); Choo-Bhin Ong, Foothill Ranch, CA (US); Jonathan K. Cheng, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/105,603

(22) Filed: Dec. 13, 2013

Related U.S. Application Data

(60) Provisional application No. 61/897,063, filed on Oct. 29, 2013.

(51) Int. Cl.
*G11B 15/18* (2006.01)

(52) U.S. Cl.
USPC .......................................... 360/71; 369/53.43

(58) Field of Classification Search
None
See application file for complete search history.

(56) References Cited

U.S. PATENT DOCUMENTS

| | | |
|---|---|---|
| 5,333,138 A | 7/1994 | Richards et al. |
| 5,420,998 A | 5/1995 | Horning |
| 5,457,786 A | 10/1995 | Roush |
| 5,471,604 A | 11/1995 | Hasbun et al. |
| 5,581,785 A | 12/1996 | Nakamura et al. |
| 5,586,291 A | 12/1996 | Lasker et al. |
| 5,636,355 A | 6/1997 | Ramakrishnan et al. |
| 5,682,273 A | 10/1997 | Hetzler |
| 5,905,901 A | 5/1999 | Klein |
| 5,913,067 A | 6/1999 | Klein |
| 5,954,820 A | 9/1999 | Hetzler |
| 6,044,439 A | 3/2000 | Ballard et al. |
| 6,115,200 A | 9/2000 | Allen et al. |
| 6,236,527 B1 | 5/2001 | Uchiike et al. |
| 6,275,949 B1 | 8/2001 | Watanabe |
| 6,295,577 B1 | 9/2001 | Anderson et al. |
| 6,408,357 B1 | 6/2002 | Hanmann et al. |
| 6,429,990 B2 | 8/2002 | Serrano et al. |
| 6,437,935 B1 | 8/2002 | Johnson et al. |
| 6,614,616 B1 | 9/2003 | Michel et al. |
| 6,661,591 B1 | 12/2003 | Rothberg |
| 6,662,267 B2 | 12/2003 | Stewart |
| 6,687,850 B1 | 2/2004 | Rothberg |
| 6,725,397 B1 | 4/2004 | Emberty et al. |
| 6,732,241 B2 | 5/2004 | Riedel |

(Continued)

OTHER PUBLICATIONS

U.S. Appl. No. 12/720,568, filed Mar. 9, 2010, 22 pages.

(Continued)

*Primary Examiner* — Paul Huber

(57) ABSTRACT

A data storage device (DSD) enters a high spindle suppression (HSS) mode to reduce instances of rotation of a spindle motor of the DSD during the HSS mode. When a read command is received from a host to read requested data from the DSD in the HSS mode, it is determined whether the requested data is not stored in a solid state memory of the DSD. If it is determined that the requested data is not stored in the solid state memory, the spindle motor is controlled to rotate a disk of the DSD. The requested data is read from the disk and stored in the solid state memory before completing transfer of the requested data to the host.

24 Claims, 5 Drawing Sheets

(56) References Cited

U.S. PATENT DOCUMENTS

| | | |
|---|---|---|
| 6,754,021 B2 | 6/2004 | Kisaka et al. |
| 6,798,599 B2 | 9/2004 | Dykes et al. |
| 6,807,630 B2 | 10/2004 | Lay et al. |
| 6,845,456 B1 | 1/2005 | Menezes et al. |
| 6,856,556 B1 | 2/2005 | Hajeck |
| 6,892,313 B1 | 5/2005 | Codilian et al. |
| 6,909,574 B2 | 6/2005 | Aikawa et al. |
| 6,928,518 B2 | 8/2005 | Talagala |
| 6,968,450 B1 | 11/2005 | Rothberg et al. |
| 7,003,620 B2 | 2/2006 | Avraham et al. |
| 7,017,037 B2 | 3/2006 | Fortin et al. |
| 7,028,174 B1 | 4/2006 | Atai-Azimi et al. |
| 7,076,605 B1 | 7/2006 | Son |
| 7,082,494 B1 | 7/2006 | Thelin et al. |
| 7,107,444 B2 | 9/2006 | Fortin et al. |
| 7,114,029 B1 | 9/2006 | Thelin |
| 7,120,806 B1 | 10/2006 | Codilian et al. |
| 7,126,857 B2 | 10/2006 | Hajeck |
| 7,139,933 B2 | 11/2006 | Hsu et al. |
| 7,142,385 B2 | 11/2006 | Shimotono et al. |
| 7,206,948 B2 | 4/2007 | Brauer |
| 7,231,198 B2 | 6/2007 | Loughran |
| 7,254,721 B1 | 8/2007 | Tobias et al. |
| 7,275,166 B2 | 9/2007 | Kaiju et al. |
| 7,334,082 B2 | 2/2008 | Grover et al. |
| 7,340,647 B2 | 3/2008 | Aasheim et al. |
| 7,350,105 B2 | 3/2008 | Aasheim et al. |
| 7,392,340 B1 | 6/2008 | Dang et al. |
| 7,395,452 B2 | 7/2008 | Nicholson et al. |
| 7,411,757 B2 | 8/2008 | Chu et al. |
| 7,421,552 B2 | 9/2008 | Long |
| 7,425,810 B2 | 9/2008 | Hobbet et al. |
| 7,430,136 B2 | 9/2008 | Merry, Jr. et al. |
| 7,447,807 B1 | 11/2008 | Merry et al. |
| 7,461,202 B2 | 12/2008 | Forrer, Jr. et al. |
| 7,468,854 B2 | 12/2008 | Yamashita et al. |
| 7,472,222 B2 | 12/2008 | Auerbach et al. |
| 7,477,477 B2 | 1/2009 | Maruchi et al. |
| 7,483,234 B2 | 1/2009 | Shimozato |
| 7,502,256 B2 | 3/2009 | Merry, Jr. et al. |
| 7,509,441 B1 | 3/2009 | Merry et al. |
| 7,509,471 B2 | 3/2009 | Gorobets |
| 7,516,346 B2 | 4/2009 | Pinheiro et al. |
| 7,552,347 B2 | 6/2009 | Schutte |
| 7,596,643 B2 | 9/2009 | Merry, Jr. et al. |
| 7,610,438 B2 | 10/2009 | Lee et al. |
| 7,610,445 B1 | 10/2009 | Manus et al. |
| 7,613,876 B2 | 11/2009 | Bruce et al. |
| 7,620,773 B2 | 11/2009 | Nicholson et al. |
| 7,644,231 B2 | 1/2010 | Recio et al. |
| 7,647,513 B2 | 1/2010 | Tobias et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,360 B1 | 3/2010 | Brunnett et al. |
| 7,685,374 B2 | 3/2010 | Diggs et al. |
| 7,698,586 B2 | 4/2010 | Kim et al. |
| 7,719,785 B2 | 5/2010 | Taniguchi et al. |
| 7,733,712 B1 | 6/2010 | Walston et al. |
| 7,752,491 B1 | 7/2010 | Liikanen et al. |
| 7,765,373 B1 | 7/2010 | Merry et al. |
| 7,774,556 B2 | 8/2010 | Karamcheti et al. |
| 7,797,487 B2 | 9/2010 | Lubbers et al. |
| 7,817,372 B2 | 10/2010 | Takahashi |
| 7,835,104 B2 | 11/2010 | Yamashita et al. |
| 7,890,696 B2 | 2/2011 | Lawson |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,984,259 B1 | 7/2011 | English |
| 8,060,707 B2 | 11/2011 | Fairhurst et al. |
| 8,078,918 B2 | 12/2011 | Diggs et al. |
| 8,090,899 B1 | 1/2012 | Syu |
| 8,095,851 B2 | 1/2012 | Diggs et al. |
| 8,098,451 B2 | 1/2012 | Graef |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,139,307 B2 | 3/2012 | Kim et al. |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,169,726 B2 | 5/2012 | Wilson |
| 8,243,525 B1 | 8/2012 | Kan |
| 8,244,975 B2 | 8/2012 | DeCenzo |
| 8,245,003 B2 | 8/2012 | Suzuki et al. |
| 8,254,172 B1 | 8/2012 | Kan |
| 8,261,012 B2 | 9/2012 | Kan |
| 8,286,018 B2 | 10/2012 | Chang et al. |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,644 B2 * | 12/2013 | Kumasawa et al. ............ 710/36 |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,501 B2 | 5/2014 | Flynn et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,773,802 B1 | 7/2014 | Anderson et al. |
| 8,775,720 B1 | 7/2014 | Meyer et al. |
| 8,782,327 B1 | 7/2014 | Kang et al. |
| 8,782,334 B1 | 7/2014 | Boyle et al. |
| 8,788,778 B1 | 7/2014 | Boyle |
| 8,788,779 B1 | 7/2014 | Horn |
| 8,788,880 B1 | 7/2014 | Gosla et al. |
| 2002/0083264 A1 | 6/2002 | Coulson |
| 2003/0140198 A1 | 7/2003 | Ninose et al. |
| 2003/0145167 A1 | 7/2003 | Tomita |
| 2005/0108473 A1 | 5/2005 | Le Moal et al. |
| 2005/0120251 A1 | 6/2005 | Fukumori |
| 2006/0075185 A1 | 4/2006 | Azzarito et al. |
| 2006/0195657 A1 | 8/2006 | Tien et al. |
| 2007/0006021 A1 | 1/2007 | Nicholson et al. |
| 2007/0050540 A1 | 3/2007 | Klein |
| 2007/0162693 A1 | 7/2007 | Nam |
| 2008/0024899 A1 | 1/2008 | Chu et al. |
| 2008/0040537 A1 | 2/2008 | Kim |
| 2008/0049354 A1 | 2/2008 | Nitta |

(56) References Cited

U.S. PATENT DOCUMENTS

| | | |
|---|---|---|
| 2008/0059694 A1 | 3/2008 | Lee |
| 2008/0130156 A1* | 6/2008 | Chu et al. .................. 360/71 |
| 2008/0177938 A1 | 7/2008 | Yu |
| 2008/0222353 A1 | 9/2008 | Nam et al. |
| 2008/0256287 A1 | 10/2008 | Lee et al. |
| 2008/0288714 A1 | 11/2008 | Salomon et al. |
| 2008/0307270 A1 | 12/2008 | Li |
| 2009/0019218 A1 | 1/2009 | Sinclair et al. |
| 2009/0024793 A1 | 1/2009 | Fontenot et al. |
| 2009/0031072 A1 | 1/2009 | Sartore |
| 2009/0089501 A1 | 4/2009 | Ahn et al. |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172249 A1 | 7/2009 | Matthews |
| 2009/0172324 A1 | 7/2009 | Han et al. |
| 2009/0172499 A1 | 7/2009 | Olbrich et al. |
| 2009/0198940 A1 | 8/2009 | Ash et al. |
| 2009/0213486 A1 | 8/2009 | Takahashi |
| 2009/0249168 A1 | 10/2009 | Inoue |
| 2009/0271562 A1 | 10/2009 | Sinclair |
| 2009/0327603 A1 | 12/2009 | McKean et al. |
| 2010/0067138 A1 | 3/2010 | Ooi et al. |
| 2010/0088459 A1 | 4/2010 | Arya et al. |
| 2010/0122030 A1 | 5/2010 | Peters et al. |
| 2010/0169541 A1 | 7/2010 | Freikorn |
| 2010/0174849 A1 | 7/2010 | Walston et al. |
| 2010/0191922 A1 | 7/2010 | Dickey et al. |
| 2010/0195243 A1* | 8/2010 | Zhu et al. .................. 360/73.03 |
| 2010/0250793 A1 | 9/2010 | Syu |
| 2010/0325352 A1 | 12/2010 | Schuette et al. |
| 2011/0010490 A1 | 1/2011 | Kwon et al. |
| 2011/0099323 A1 | 4/2011 | Syu |
| 2011/0106804 A1 | 5/2011 | Keeler et al. |
| 2011/0283049 A1 | 11/2011 | Kang et al. |
| 2011/0283128 A1 | 11/2011 | Farhan et al. |
| 2012/0170435 A1 | 7/2012 | Trantham |
| 2012/0260020 A1 | 10/2012 | Suryabudi et al. |
| 2012/0278531 A1 | 11/2012 | Horn |
| 2012/0284460 A1 | 11/2012 | Guda |
| 2012/0290779 A1 | 11/2012 | Eleftheriou et al. |
| 2012/0317338 A1 | 12/2012 | Yi et al. |
| 2012/0324191 A1 | 12/2012 | Strange et al. |
| 2013/0024650 A1 | 1/2013 | Ambat et al. |
| 2013/0117520 A1 | 5/2013 | Ryu |
| 2013/0132638 A1 | 5/2013 | Horn et al. |
| 2013/0145106 A1 | 6/2013 | Kan |
| 2013/0173850 A1 | 7/2013 | Song |
| 2013/0290668 A1 | 10/2013 | Na |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0133220 A1 | 5/2014 | Danilak et al. |
| 2014/0136753 A1 | 5/2014 | Tomlin et al. |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf, Proceedings First Workshop on Integrating Solid-State Memory into the Storage Hierarchy, WISH 2009, Mar. 7, 2009, Washington DC, pp. 1-8.

Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb., 2010. FAST 2010: 8th USENIX Conference on File and Storage Technologies, 14 pages.

Xiaojian Wu, A. L. Narasimha Reddy, "Managing Storage Space in a Flash and Disk Hybrid Storage System", http://www.ee.tamu.edu/~reddy/papers/mascots09.pdf Int'l Symposium on Modeling, Analysis & Simulation of Computer and Telecommunication Systems 2009 (MASCOTS I 09), Sep. 21-23, 2009, pp. 1-4.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.12 pages.

Non-Volatile Memory Host Controller Interface revision 1.0 specification available for download at http://www.intel.com/standards/nvmhci/index.htm. Ratified on Apr. 14, 2008, 65 pages.

DongKyu Lee; Koh, K.; "PDC-NH: Popular data concentration on NAND flash and hard disk drive," 2009 10th IEEE/ACM International Conference on Grid Computing, pp. 196-200, Oct. 13-15, 2009.

Boyle, et. al., U.S. Appl. No. 12/824,959, filed Jun. 28, 2010, 21 pages.

Boyle, et. al., U.S. Appl. No. 13/105,800, filed May 11, 2011, 19 pages.

Malina, et. al., U.S. Appl. No. 13/673,956, filed Nov. 9, 2012, 40 pages.

Chen, et. al., U.S. Appl. No. 14/024,498, filed Sep. 11, 2013, 19 pages.

Robert L. Horn, U.S. Appl. No. 14/086,916, filed Nov. 21, 2013, 24 pages.

* cited by examiner

POWER MANAGEMENT FOR DATA STORAGE DEVICE

CROSS-REFERENCE TO RELATED APPLICATION

This application claims the benefit of U.S. Provisional Application No. 61/897,063, filed on Oct. 29, 2013, which is hereby incorporated by reference in its entirety.

BACKGROUND

Data Storage Devices (DSDs) are often used to record data onto or to reproduce data from a storage media. Some DSDs include multiple types of storage media. In the case of a Solid State Hybrid Drive (SSHD), a solid state storage media such as a flash memory is used for storing data in addition to at least one rotating magnetic disk for storing data. Typically, using the solid state media consumes less power than using the disk since the disk must be spun up to read and write data on the disk.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Environment

Figure 1:
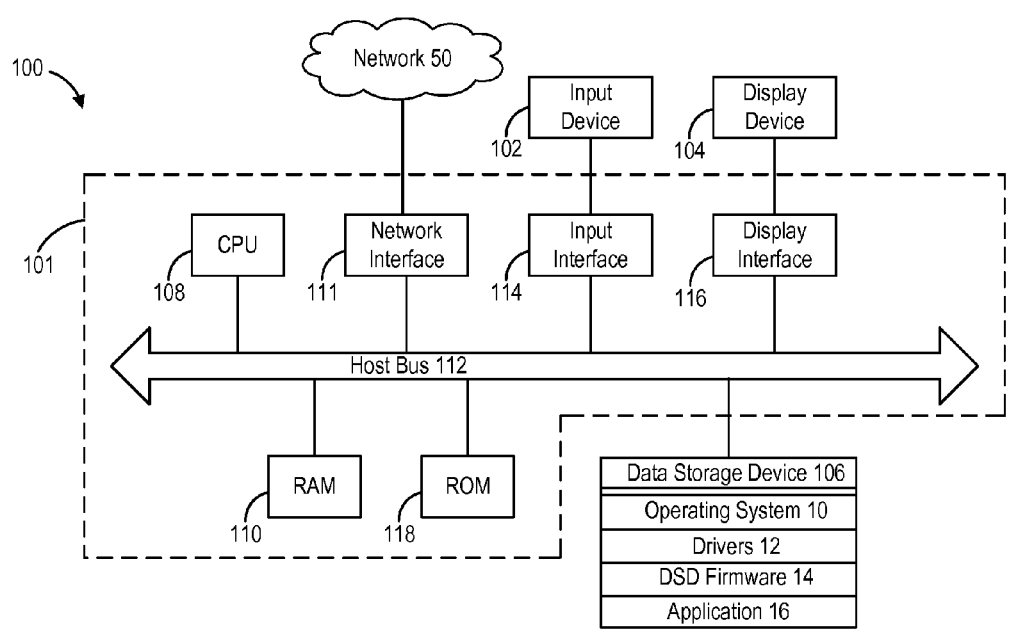
FIG. 1 is a block diagram depicting a computer system according to an embodiment.

FIG. 1 shows computer system 100 according to an embodiment which includes host 101, input device 102, display device 104 and Data Storage Device (DSD) 106. Computer system 100 can be, for example, a computer system (e.g., desktop, mobile/laptop, tablet, smartphone, etc.) or other electronic device such as a digital video recorder (DVR). In this regard, computer system 100 may be a stand-alone system or part of a network, such as network 50, which can, for example, be a local or wide area network or the Internet.

Input device 102 can be a keyboard, scroll wheel, or pointing device allowing a user of computer system 100 to enter information and commands to computer system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are Random Access Memory (RAM) 110, input interface 114 for input device 102, display interface 116 for display device 104, Read Only Memory (ROM) 118, network interface 111 and DSD 106.

RAM 110 is a volatile memory of host 101 that interfaces with host bus 112 so as to provide information stored in RAM 110 to CPU 108 during execution of instructions in software programs such as Operating System (OS) 10 or drivers 12. More specifically, CPU 108 first loads computer-executable instructions from DSD 106 or another data storage device into a region of RAM 110. CPU 108 can then execute the stored process instructions from RAM 110. Data such as data to be stored in DSD 106 or data retrieved from DSD 106 can also be stored in RAM 110 so that the data can be accessed by CPU 108 during execution of software programs to the extent that such software programs have a need to access and/or modify the data.

As shown in FIG. 1, DSD 106 stores OS 10, drivers 12, DSD firmware 14, and application 16. Drivers 12 provide software interfaces for components of computer system 100, such as CPU 108 and DSD 106. DSD firmware 14 includes computer-executable instructions for DSD 106 that can cause DSD 106 to perform the power management processes discussed below. Application 16 can be, for example, an email program or other program that retrieves data from network 50 via network interface 111.

Although FIG. 1 depicts the co-location of host 101 and DSD 106, in other embodiments the two need not be physically co-located. In such embodiments, DSD 106 may be located remotely from host 101 and connected to host 101 via a network interface such as network interface 111. In addition, those of ordinary skill in the art will appreciate that computer system 100 can include more or less than those elements shown in FIG. 1 and that the disclosed power management processes may be implemented in other environments.

Data Storage Device Overview

Figure 2:
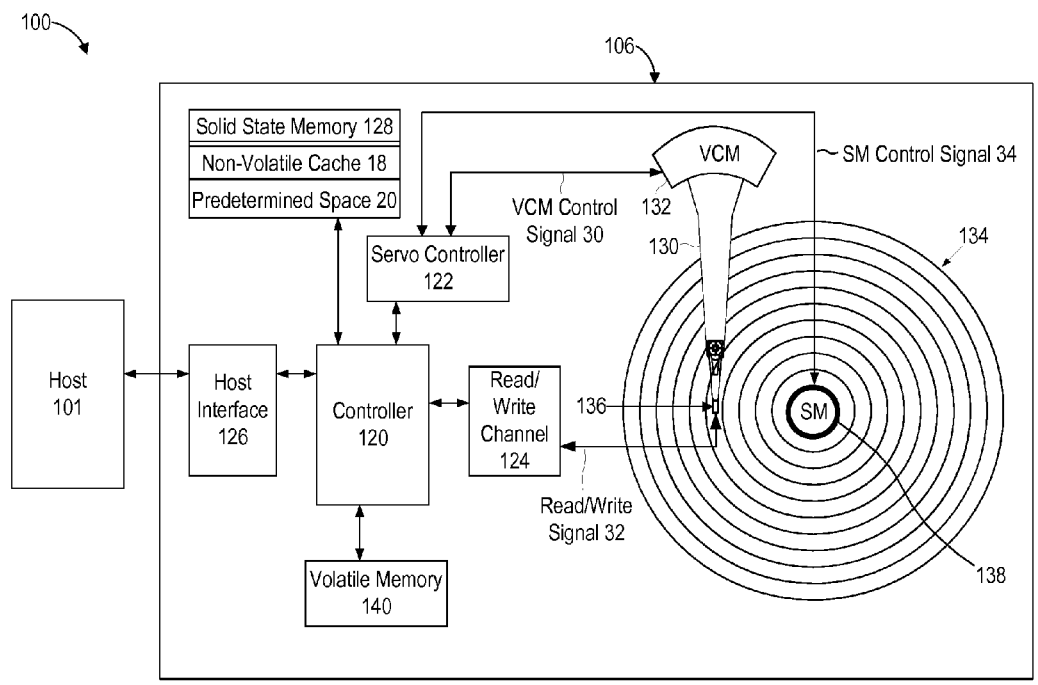
FIG. 2 is a block diagram depicting a Data Storage Device (DSD) of the computer system of FIG. 1 according to an embodiment.

FIG. 2 illustrates a block diagram of DSD 106 according to an embodiment. In the example of FIG. 2, DSD 106 is a hybrid drive including two types of Non-Volatile Memory (NVM) media, i.e., rotating magnetic disks in disk pack 134 and solid state memory 128. While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single- Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

DSD 106 includes controller 120 which includes circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

In the example of FIG. 2, disk pack 134 is rotated by Spindle Motor (SM) 138. DSD 106 also includes Head Stack Assembly (HSA) 136 connected to the distal end of actuator 130 which is rotated by Voice Coil Motor (VCM) 132 to position HSA 136 in relation to disk pack 134. Servo controller 122 includes circuitry to control the position of HSA 136 and the rotation of disk pack 134 using VCM control signal 30 and SM control signal 34, respectively.

Disk pack 134 comprises multiple disks that are radially aligned so as to rotate about SM 138. Each disk in disk pack 134 includes a number of radial spaced, concentric tracks for storing data on a disk surface. HSA 136 includes multiple heads each arranged to read data from and write data to a corresponding surface of a disk in disk pack 134. Read/write channel 124 includes circuitry for encoding data to be written to disk pack 134 and for decoding data read from disk pack 134. As will be appreciated by those of ordinary skill in the art, read/write channel 124 can be included as part of controller 120.

DSD 106 also includes solid state memory 128 for storing data. Solid state memory 128 stores Non-Volatile Cache (NVC) 18 where data can be retained across power cycles (i.e., after turning DSD 106 off and on). NVC 18 can be used to store data which may or may not also be stored in disk pack 134. In addition, solid state memory 128 includes predetermined space 20 for storing data. In some embodiments, predetermined space 20 is a portion of solid state memory 128 that is not visible or detectable to host 101.

Volatile memory 140 can include, for example, a Dynamic Random Access Memory (DRAM) which can be used by DSD 106 to temporarily store data. Data stored in volatile memory 140 can include data read from NVM (e.g., disk pack 134 or solid state memory 128), data to be written to NVM, instructions loaded from DSD firmware 14 for execution by controller 120, and/or data used in executing DSD firmware 14.

In operation, host interface 126 receives host read and write commands from host 101 via host interface 126 for reading data from and writing data to NVM such as solid state memory 128 and disk pack 134. In response to a write command from host 101, controller 120 may buffer the data to be written for the write command in volatile memory 140.

For data to be written to disk pack 134, read/write channel 124 then encodes the buffered data into write signal 32 which is provided to HSA 136 for magnetically writing data to a disk surface of disk pack 134.

In response to a read command for data stored on a disk surface of disk pack 134, controller 120 positions HSA 136 via servo controller 122 to magnetically read the data stored on a surface of disk pack 134. HSA 136 sends the read data as read signal 32 to read/write channel 124 for decoding and the data is buffered in volatile memory 140 for transferring to host 101 via host interface 126.

The foregoing operation of disk pack 134 generally requires more power than using solid state memory 128 since disk pack 134 needs to be physically spun up to an operating speed by SM 138 before reading or writing data on disk pack 134. To reduce power consumption, DSD 106 may enter a High Spindle Suppression (HSS) mode to reduce or suppress instances when disk pack 134 needs to be spun up.

As part of the HSS mode, DSD 106 can perform a deferred write operation that allows DSD 106 to write host data that is to be written to disk pack 134 to solid state memory 128 and later write the host data to its intended location in disk pack 134. This deferred writing can ordinarily save power by not having to power SM 138 to spin up disk pack 134 to an operational speed for writing the host data. The host data from deferred write operations can be stored in solid state memory 128 in NVC 18 if there is already an address allocated for the host data (i.e., a write hit). As discussed below with reference to FIG. 5, if there is not already an address allocated for the host data (i.e, a write miss), the host data can be stored in predetermined space 20 in solid state memory 128.

NVC 18 can also store a copy of certain data stored on disk pack 134 to prevent disk pack 134 from having to spin up in the HSS mode. Such data can include frequently accessed data or data used to boot or power up DSD 106 or computer system 100. For example, in a "spin-less drive boot" implementation, NVC 18 can include data for starting computer system 100 or DSD 106 such as DSD firmware 14 or an internal file system for DSD 106. Upon power up of DSD 106, controller 120 can load this data and be ready to receive commands from host 101 without having to spin up disk pack 134. This arrangement can ordinarily allow for a quicker ready time for DSD 106 and can allow DSD 106 to keep SM 138 powered down, in addition to keeping other components for operation of disk pack 134 powered down such as servo controller 122 and read/write channel 124. Examples of a spin-less drive boot can be found in co-pending application Ser. No. 14/105,696, entitled "Data Storage Device Startup," filed on Dec. 13, 2013, which is hereby incorporated by reference in its entirety.

According to another aspect of the HSS mode, NVC 18 can allow for an inline non-volatile cache fill to take advantage of times when disk pack 134 is spun up to access data that is not addressed in solid state memory 128 (i.e., a read miss). As discussed below in more detail with reference to FIG. 4, the HSS mode can cause controller 120 to store host requested data accessed from disk pack 134 in NVC 18 before transferring the requested data to host 101. On subsequent read commands for the requested data, disk pack 134 can remain spun down since the requested data will be available in solid state memory 128 (i.e., a read hit). Storing the requested data in NVC 18 can save power and improve a data access time when the same data is repeatedly requested by host 101. In addition, storing the requested data in NVC 18 can be advantageous in situations such as the fresh data collection cycle example of FIG. 3 where there may not otherwise be sufficient idle time for controller 120 to store a copy of the requested data in solid state memory 128.

Fresh Data Collection Cycle Example

Figure 3:
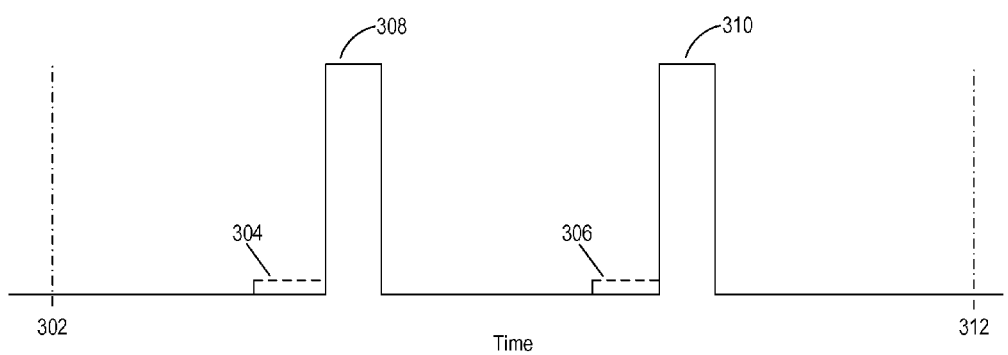
FIG. 3 is a graph illustrating a fresh data collection cycle according to an embodiment.

FIG. 3 is a graph illustrating a fresh data collection cycle while DSD 106 is in the HSS mode according to an embodiment. In the example of FIG. 3, computer system 100 remains in a low power state such as a sleep or standby mode between sleep entry time 302 and sleep exit time 312. Computer system 100 or portions of computer system 100 periodically wake up during periods such as collection periods 304 and 306 to retrieve data and provide computer system 100 with fresh data. An application running on host 101, such as application 16, may be configured to automatically collect data from network 50 such as new email data or another type of network data.

After each of collection periods 304 and 306, the collected data is stored in DSD 106 during storage periods 308 and 310. Once the collected data has been stored to DSD 106, power is removed from DSD 106. In order to reduce power consumption, DSD 106 can remain in the HSS mode between sleep entry time 302 and sleep exit time 312 to suppress the number of times that disk pack 134 needs to be spun up and to avoid powering other components of DSD 106 that are related to operation of disk pack 134, such as servo controller 122 and read/write channel 124.

The HSS mode can be set based on an indication received from host 101. For example, a DSD driver of drivers 12 may provide DSD 106 with a command to set the HSS mode. In another implementation, a different driver of drivers 12 running on host 101 may provide DSD 106 with an indication that host 101 is entering a particular state, such as the fresh data collection cycle of FIG. 3. DSD 106 may then set the HSS mode based on the indication received from host 101.

In other implementations, DSD 106 may determine to enter the HSS mode on its own by detecting a particular data access activity of host 101. For example, controller 120 may identify particular logical block addresses (LBAs) requested by host 101 as associated with the HSS mode. In one such example, an initial LBA accessed during a power up of DSD 106 may indicate to controller 120 that DSD 106 should enter the HSS mode. The association between the data access activity of host 101 and the HSS mode may be formed as part of a learning algorithm of DSD firmware 14.

By setting the HSS mode, DSD 106 can switch its normal operating processes for higher performance (e.g., reducing data access times, increasing Input/Output Operations Per Second (IOPS)) with power saving processes to reduce instances where disk pack 134 needs to be spun up.

DSD 106 may also exit the HSS mode based on an indication received from host 101 such as a command sent from drivers 12 to exit the HSS mode or an indication sent from drivers 12 for a particular state of host 101 such as the end of a fresh data collection cycle state or the end of a low power state (e.g., a sleep or standby mode). The indication to exit the HSS mode may result from the detection of an input received via input device 102. Such inputs may come from, for example, a user touching a keyboard or opening a lid of computer system 100 in the case where computer system 100 is a laptop computer.

In conventional Solid State Hybrid Drives (SSHDs) including both rotating magnetic disks and solid state memory, certain data requested by the host that is not stored in the solid state memory may be moved to the solid state memory during an idle time when the SSHD is not servicing other host commands. However, in the example of FIG. 3, storage periods 308 and 310 are kept short to provide a low power consumption between sleep entry time 302 and sleep exit time 312. As a result, there is generally not enough idle time to move data from the disks to the solid state memory in a conventional SSHD and subsequent requests for the same data require spinning up the disks. In contrast, DSD 106 can perform the read process of FIG. 4 to ordinarily avoid spinning up disk pack 134 to service read commands for the same data.

Example Read Process

Figure 4:
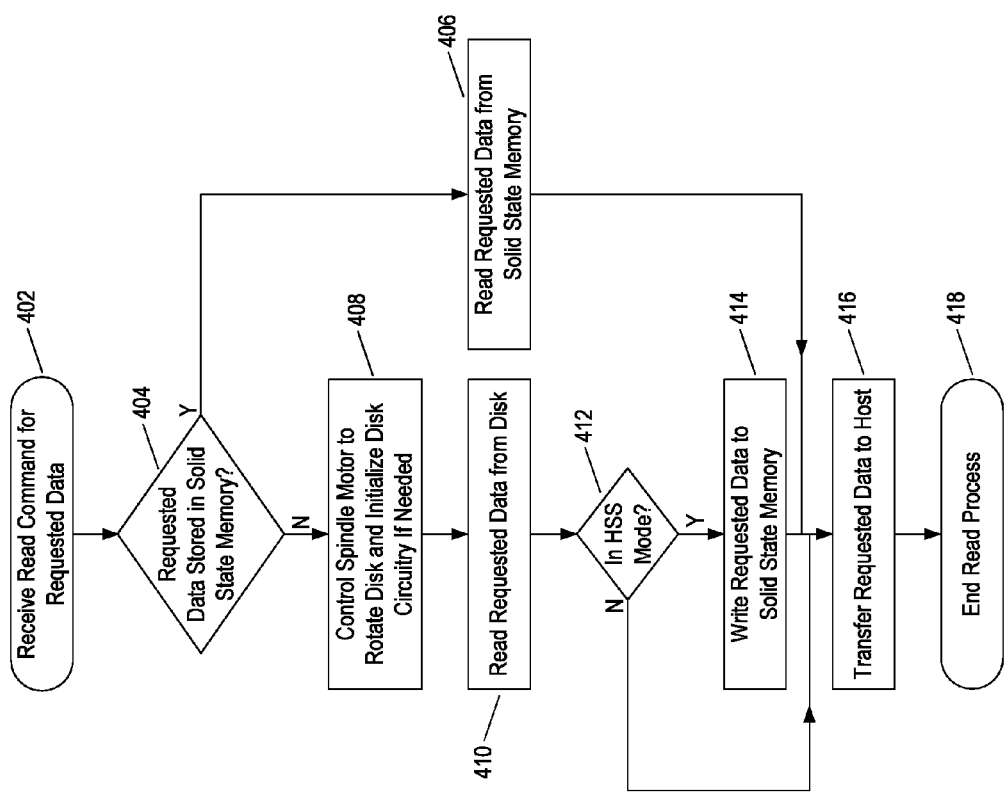
FIG. 4 is a flowchart for a read process according to an embodiment.

FIG. 4 is a flowchart for a read process that can be performed by controller 120 according to an embodiment. The read process begins in block 402 when DSD 106 receives a read command from host 101 via host interface 126 for requested data stored in DSD 106. Controller 120 determines in block 404 whether the requested data is stored in solid state memory 128. If so, controller 120 reads the requested data from solid state memory 128 in block 406. If not, controller 120 in block 408 controls SM 138 to rotate disk pack 134 and initialize any needed circuitry such as servo controller 122 or read/write channel 124 if the circuitry is powered down or not otherwise ready to operate. In block 410, controller 120 reads the requested data from disk pack 134.

Controller 120 determines in block 412 whether DSD 106 is in the HSS mode. If not, the requested data read in either block 410 or block 406 is transferred to host 101 via host interface 126. If controller 120 determines in block 412 that DSD 106 is in the HSS mode, controller 120 writes the requested data to NVC 18 in solid state memory 128 before completing the transfer of requested data to host 101 in block 416. By writing the requested data to solid state memory 128 before completion of the transfer of requested data to host 101, the requested data will be available in solid state memory 128 for servicing future read commands from host 101 without spinning up disk pack 134, thereby saving power in the HSS mode.

After transferring the requested data to host 101 in block 416, the read process of FIG. 4 ends in block 418.

Example Write Process

Figure 5:
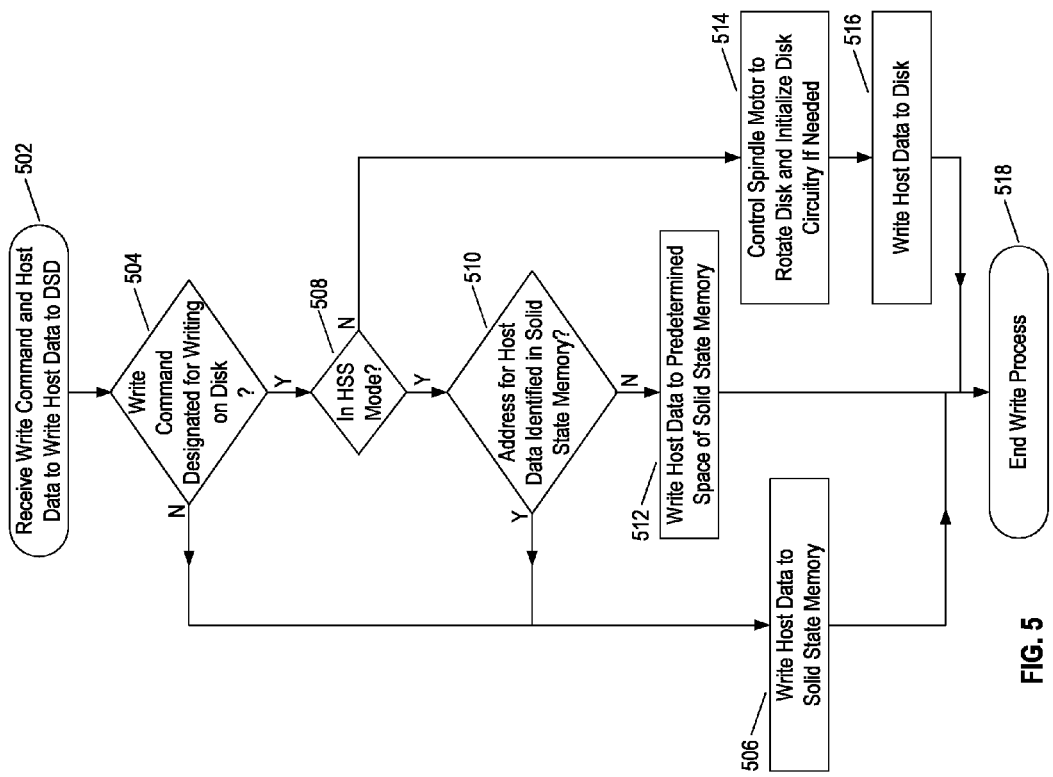
FIG. 5 is a flowchart for a write process according to an embodiment.

FIG. 5 is a flowchart for a write process that can be performed by controller 120 according to an embodiment. In block 502, DSD 106 receives a write command from host 101 with host data for storage in DSD 106. In block 504, controller 120 determines whether the write command is designated for writing on disk pack 134. This designation may come from a hinting policy provided by host 101 with the host command. For example, certain writes may be hinted for writing in solid state memory 128 or disk pack 134. If it is determined that the host command is not designated for disk pack 134, controller 120 writes the host data to solid state memory 128 in block 506 and the write process ends in block 518. As part of writing the host data to solid state memory 128, controller 120 may check that there is enough available storage capacity in solid state memory 128 to write the host data to solid state memory 128. In some embodiments, if there is not enough storage capacity, controller 120 may instead write the host data to disk pack 134.

If it is determined in block 504 that the write command is designated for disk pack 134, controller 120 determines in block 508 whether DSD 106 is in the HSS mode. If not, controller 120 controls SM 138 in block 514 to rotate disk pack 134 and initialize any circuitry needed for writing the host data to disk pack 134. In block 516, the host data is written to disk pack 134 and the write process ends in block 518.

If it is determined that DSD 106 is in the HSS mode in block 508, then controller 120 determines in block 510 whether there is an address in solid state memory 128 for the host data. If so, the host data is written to solid state memory 128 in block 506. As discussed above, controller 120 may also check whether there is enough available storage capacity in solid state memory 128 before writing the host data to solid state memory 128.

If it is determined in block 510 that there is not an address in solid state memory 128 for the host data, controller 120 writes the host data to a predetermined space of solid state memory 128 that is not visible or detectable to host 101 and the write process ends in block 518. The host data may be marked for later migration to its designated location in disk pack 134 when DSD 106 is not in the HSS mode.

By deferring writes to solid state memory 128, including those writes that are not addressed for solid state memory 128 (i.e., a write miss), it is ordinarily possible to save power in the HSS mode by avoiding spinning up disk pack 134 to perform the write.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD), comprising:
 a disk for storing data;
 a spindle motor for rotating the disk;
 a solid state memory for storing data; and
 a controller configured to:
  enter a high spindle suppression (HSS) mode to reduce instances of rotation of the spindle motor during the HSS mode;
  receive a read command from a host to read requested data from the DSD while the DSD is in the HSS mode;
  determine whether the requested data is not stored in the solid state memory; and
  when it is determined that the requested data is not stored in the solid state memory:
  control the spindle motor to rotate the disk;
  read the requested data from the disk; and
  store the requested data in the solid state memory before completing transfer of the requested data to the host.

2. The DSD of claim 1, wherein the controller is further configured to:
 receive a write command from the host to write host data to the disk of the DSD while the DSD is in the HSS mode;
 determine whether there is an address allocated for the host data in the solid state memory; and
 if it is determined there is not an address allocated for the host data, write the host data to a predetermined space of the solid state memory.

3. The DSD of claim 1, wherein the controller is further configured to enter the HSS mode based on an indication received from the host.

4. The DSD of claim 3, wherein the indication received from the host indicates that the host is entering a low power state.

5. The DSD of claim 3, wherein the indication received from the host indicates that the host is entering a fresh data collection cycle where the host periodically retrieves data from a network for storage in the DSD.

6. The DSD of claim 1, wherein the controller is further configured to enter the HSS mode based on data access activity by the host.

7. The DSD of claim 6, wherein the controller is further configured to enter the HSS mode by identifying an address corresponding to data requested by the host as associated with a startup of the DSD or a startup of the host.

8. The DSD of claim 1, wherein the controller is further configured to exit the HSS mode based on an indication received from the host.

9. A method for operating a data storage device (DSD), the method comprising:
 entering a high spindle suppression (HSS) mode to reduce instances of rotation of a spindle motor of the DSD during the HSS mode;

receiving a read command from a host to read requested data from the DSD while the DSD is in the HSS mode;

determining whether the requested data is not stored in a solid state memory of the DSD; and when it is determined that the requested data is not stored in the solid state memory:
- controlling the spindle motor to rotate a disk of the DSD;
- reading the requested data from the disk; and
- storing the requested data in the solid state memory before completing transfer of the requested data to the host.

10. The method of claim 9, further comprising:

receiving a write command from the host to write host data to the disk of the DSD while the DSD is in the HSS mode;

determining whether there is an address allocated for the host data in the solid state memory; and if it is determined there is not an address allocated for the host data, writing the host data to a predetermined space of the solid state memory.

11. The method of claim 9, further comprising entering the HSS mode based on an indication received from the host.

12. The method of claim 11, wherein the indication received from the host indicates that the host is entering a low power state.

13. The method of claim 11, wherein the indication received from the host indicates that the host is entering a fresh data collection cycle where the host periodically retrieves data from a network for storage in the DSD.

14. The method of claim 9, further comprising entering the HSS mode based on data access activity by the host.

15. The method of claim 14, further comprising entering the HSS mode by identifying an address corresponding to data requested by the host as associated with a startup of the DSD or a startup of the host.

16. The method of claim 9, further comprising exiting the HSS mode based on an indication received from the host.

17. A non-transitory computer readable medium storing computer-executable instructions, wherein when the computer executable instructions are executed by a processor or a controller, the computer executable instructions cause a data storage device (DSD) to:

enter a high spindle suppression (HSS) mode to reduce instances of rotation of a spindle motor of the DSD during the HSS mode;

receive a read command from a host to read requested data from the DSD while the DSD is in the HSS mode;

determine whether the requested data is not stored in a solid state memory of the DSD; and when it is determined that the requested data is not stored in the solid state memory:
- control the spindle motor to rotate a disk of the DSD;
- read the requested data from the disk; and
- store the requested data in the solid state memory before completing transfer of the requested data to the host.

18. The computer readable medium of claim 17, wherein the computer-executable instructions further cause the DSD to:

receive a write command from the host to write host data to the disk of the DSD while the DSD is in the HSS mode;

determine whether there is an address allocated for the host data in the solid state memory; and if it is determined there is not an address allocated for the host data, write the host data to a predetermined space of the solid state memory.

19. The computer readable medium of claim 17, wherein the computer-executable instructions further cause the DSD to enter the HSS mode based on an indication received from the host.

20. The computer readable medium of claim 19, wherein the indication received from the host indicates that the host is entering a low power state.

21. The computer readable medium of claim 19, wherein the indication received from the host indicates that the host is entering a fresh data collection cycle where the host periodically retrieves data from a network for storage in the DSD.

22. The computer readable medium of claim 17, wherein the computer-executable instructions further cause the DSD to enter the HSS mode based on data access activity by the host.

23. The computer readable medium of claim 22, wherein the computer-executable instructions further cause the DSD to enter the HSS mode by identifying an address corresponding to data requested by the host as associated with a startup of the DSD or a startup of the host.

24. The computer readable medium of claim 17, wherein the computer-executable instructions further cause the DSD to exit the HSS mode based on an indication received from the host.

* * * * *